INVENTOR.
Heinz Melle

June 11, 1963 H. MELLE 3,093,041
PHOTOGRAPHIC CAMERA WITH EXPOSURE METER PHOTOCELL
ADJUSTABLE IN ACCORDANCE WITH OBJECTIVE FOCUSING
Original Filed Oct. 16, 1956 2 Sheets-Sheet 2

INVENTOR.
Heinz Melle
BY
ATTORNEYS

United States Patent Office 3,093,041
Patented June 11, 1963

3,093,041
PHOTOGRAPHIC CAMERA WITH EXPOSURE METER PHOTOCELL ADJUSTABLE IN ACCORDANCE WITH OBJECTIVE FOCUSING
Heinz Melle, Braunschweig, Germany, assignor to Voigtlander A.G., Braunschweig, Germany, a corporation of Germany
Original application Oct. 16, 1956, Ser. No. 616,247, now Patent No. 3,007,381, dated Nov. 7, 1961. Divided and this application Sept. 1, 1961, Ser. No. 135,600
7 Claims. (Cl. 95—10)

This invention relates to photographic cameras provided with exposure meters and, more particularly, to cameras of this type in which certain disadvantages of the arrangements hitherto used are reduced or eliminated. The present application is a division of my copending application Serial No. 616,247, filed October 16, 1956, now Patent No. 3,007,381, issued November 7, 1961.

Cameras embodying the present invention are preferably provided with built-in exposure meters, and it is fundamentally immaterial what type of exposure meter is used, so that either optical or photo-electric meters are useable. However, as photo-electric exposure meters are being ever more widely used in practice, due to the objectivity of their light measurements, they are preferred to optical exposure meters. Accordingly, in the following description, the primary emphasis will be placed on arrangements in which the light measurement is effected by means of a photo-electric cell having an electrical indicating instrument connected to its output.

Exposure meters integrate the various luminous flux densities of the field of the object, and thus indicate an average value of illumination. However, knowledge of such average value often is not sufficient for successful exposure of the negative material. As a result, manufacturers of exposure meters have suggested to users thereof the application of corrective factors based on empirical observations, the particular factors suggested for each case being in accordance with the conditions prevailing in such case. It will be appreciated that such expedients are not a satisfactory solution of the problem of obtaining correct exposure values, and thus are not capable of obviating defective exposures.

In the usual use of conventional exposure meters, the illumination measured by the exposure meter is not the same as that acting on the photo-sensitive film through the objective of the camera. There are several reasons for this, which are explained in more detail below.

The electric current outputs of photocells, as a result of and corresponding to light incident on the cells, are very small, so that, particularly with lower light intensities, the pointed deflections of the measuring instrument are not exactly defined and are not clearly readable. To avoid this difficulty, it has been proposed to use photocells having relatively large light exposed surfaces, but arrangements of this type find only limited use where the exposure meters are built-in into cameras as, in view of dimensional limitations of the cameras, only a small free space is available for mounting of a photocell. As a result, resort has been had to an expedient wherein the light incident upon the photocell was made to be incident over a relatively large solid angle thereon. Thus, photographic cameras have been provided wherein the solid angle of the light incident on the electric exposure meter is even larger than the solid angular field of the camera objective.

The use of such wide angle exposure meters results in larger current outputs from the photocells with consequently greater pointer deflections for a given intensity of incident light. However, with such arrangement it is possible, or even probable, that the indicated light intensity does not correspond to the actual value of light intensity available for exposure of the film. Thus, if the exposure value setting of the camera is based upon the light value as measured by the exposure meter, a defective exposure may result, even in those cases in which the aforementioned empirical corrective factors have been taken into consideration. The reason for this is that such factors are based merely on probability calculations and are correctly understood by laymen only infrequently.

Such measurements of the light values by exposure meters are basically wrong because the light values measured thereby are determined on the basis of a cone of light rays which is different from that incident upon the film to be exposed. If the solid angle of the light incident on the photocell is equal to that incident through the objective on the film or other negative material, improved results are obtained. However, even under such conditions, defective exposures can result, as will be apparent from general considerations of geometric optics.

The present invention is directed to exposure meter arrangements wherein the aforementioned disadvantages and difficulties of the prior art are obviated.

For an understanding of the principles of the invention, reference is made to the following description of typical embodiments thereof as illustrated in the accompanying drawings. In the drawings.

Figure 1:
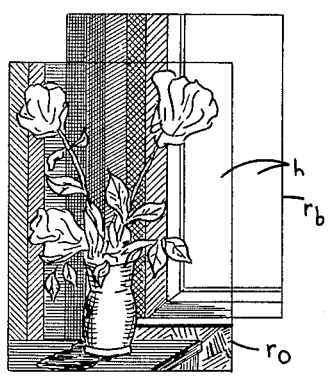
FIGS. 1 and 2 are somewhat diagrammatic illustrations showing the adverse effect which may occur when using an exposure meter in the conventional manner.
Figure 2:
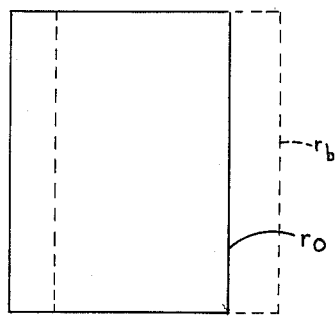

Referring to the drawings, FIGS. 1 and 2 illustrate how a defective measurement of the available light values can actually impair an exposure. Within the object field of the camera objective, which is indicated as limited by the frame $r_o$, a bunch of flowers is placed on top of a table which has a relatively low illumination. The illumination on the flowers is at a relatively low level due to the flowers being arranged in front of relatively dark wallpaper. This objective field is assumed to have a light value "7." If, however, the built-in exposure meter measures the light values of the field defined by the frame $r_b$, due to the presence of the bright surface $h$, representing, for example, a window occupying about one-half of the field $r_b$, the exposure meter will indicate a considerably higher light value, for example, the light value "11." Such differences between the average light density of the field measured by the camera objective and that of the field included by the exposure meter, and which, in the illustrated example, amounts up to about four light value units, occur in practice not infrequently. Under extreme conditions, the differences can be even higher. Such defective measurements not only can adversely affect color photography, but also can adversely affect black and white photography. If the plane at which the rays of light entering the objectives are assumed to come to a point is made coincident with the plane in which the rays of light incident upon the photo-electric cell of the exposure meter are assumed to come to a point, the defect is not corrected and the two frames $r_o$ and $r_b$, indicating the respective fields, are still off-set as best seen in FIG. 2.

In order to avoid these disadvantages, the present invention provides an arrangement wherein the light responsive component of the exposure meter is mounted in the camera for swinging about an axis fixed relative to the camera and in accordance with the sharp focusing of the camera objective. While, as stated, the type of light responsive component is immaterial, the camera is preferably provided with a photo-electric exposure meter. For the purpose of simplifying the disclosure of the invention, the electrical indicator and its circuit connections with the photo-electric cell have not been shown in all the figures of the drawings. Also, any suitable measuring and indicating mechanism can be used and, if amplifying devices are necessary between the photo-electric cell and the electrical indicator, these may be provided although they have not been shown in the drawings. For the sake of compactness, such amplifying devices would preferably constitute transistor amplifiers.

In accordance with the present invention, the light responsive component of the exposure meter is swung, during measurement of the light, in such a manner that the median of the cone of light rays incident thereupon intersects the optical axis of the camera objective in the plane of the object to be photographed. The objective and the photocell have solid angles of incident light which are equal and whose vertices lie in the same plane.

The electrical indicator component of the exposure meter can be arranged in any desired manner upon or within the camera casing, and the light responsive component of the exposure meter can be arranged on or in the front wall of the camera. It has been found to be desirable so as to arrange the swingable light responsive component in a manner such that its point of symmetry, which is decisive for the incidence of light, is located on a straight line extending parallel to a pair of limiting lines of the image field, which latter is assumed to be rectangular, and further extends at approximately the level of the axis of the camera objective.

Figure 4:
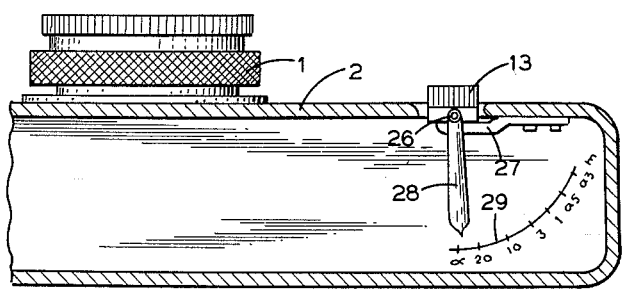
FIG. 4 is a horizontal sectional view through a camera illustrating one arrangement embodying the present invention.

Swinging of the photocell so that the median of its cone of incident light rays intersects the optical axis in the plane of sharp focusing of the objective can be effected in a simple manner by manual adjustment thereof with respect to the distance setting of the camera relative to the object plane. Referring to FIG. 4, an objective 1 is illustrated as positioned on a camera casing 2. The wall of casing 2 from which the objective 1 extends is formed with a window or aperture spaced laterally from the objective, and photocell 13 is mounted to extend through or receive light rays through this aperture. In a known manner, photocell 13 may be provided with a honey-comb diaphragm for limiting the included angle of the light incident thereupon. It will be understood that other conventional means, such as an optical lens or a lens system, may be used for limiting the included angle of the light incident on photocell 13. A bracket 27 is secured to the inner surface of the wall of camera casing 2 and carries a pin 26 serving as a pivot for the photocell 13. A pointer 28 rigid with respect to photocell 13 is cooperable with a scale 29 indicating distance in accordance with the distance setting of objective 1.

With this arrangement, if the objective 1 is adjusted or focused to a distance of one meter, the pointer 28 would be positioned at the one meter mark on the scale 29, and the scale 29 is so coordinated with the adjustment of objective 1 that, when pointer 28 is at the one meter point on scale 29 and objective 1 is set or focused to a distance of one meter, the median of the cone of incident light for photocell 13 will intersect the optical axis of objective 1 at a distance of one meter from the camera, or in the then sharply focused object plane. The other readings of scale 29 are similarly coordinated with the other distance setting of objective 1.

Figure 5:
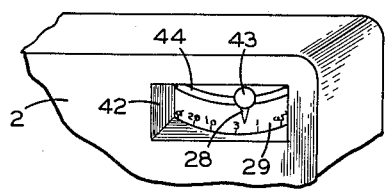
FIG. 5 is a partial rear perspective view of a camera illustrating a modification of the arrangement shown in FIG. 4.

The pointer 28 and scale 29 can be arranged on the camera cover, as by making the pin 26 rigid with the photocell 13 and by rigidly securing handle 28 to an end of pin 26 extending through the camera cover. However, a preferred embodiment of the invention is shown in FIG. 5 in which the camera casing 2 is provided with a rear window 42 through which may be seen a circular or arcuate scale 29 cooperable with the free end of pointer 28. Scale ring 29 is formed with a slot 44 through which the pointer 28 extends, and a handle 43 is provided at the free end of the pointer 28 for ready manipulation and adjustment of the photocell 13. With this arrangement, a user looking through the camera or a viewfinder in the normal way, to observe the scene to be photographed, may also readily observe the position of pointer 28 with respect to scale 29 and set this position in accordance with the distance setting of the objective 1.

It is within the scope of the invention to provide an arrangement in which the indication of the photocell pointer and its scale is reflected, in a known manner, into the viewfinder field of the camera. With such an arrangement, the position of the photocell could be checked without the necessity of the user removing his eye from the eyepiece of the viewfinder. Such reflection could be effected, if desired, in cooperation with the reflection into the viewfinder field of other indications of the camera, such as the position of adjustment or indicating components or setting elements for distance, diaphragm aperture, exposure time and light value.

In further accordance with the invention, manual adjustment of the photocell to obtain the above results can be eliminated by coupling the photocell with the sharp focusing means of the camera objective. As a result, by operation of such sharp focusing means, both the camera objective and the exposure meter photocell will be set automatically to the same picture-taking distance and will be centered on the same objective plane.

The aforementioned features represent essential features of the invention, and it should be noted that the suggested solid or included angle of incident light for the photocell provides sufficient light to the photocell for developing output currents sufficiently large for proper indication without the use of amplification, even if the included angle is similar to the incident light angle of the camera objective. Consequently, the principles of the present invention can be applied to any camera without the necessity of additional expenditure and will result in a noticeable improvement in the performance of the camera.

While, by using the above-described improvements, defective light measurements can be eliminated in many cases, in some cases occurring in practice these improvements still do not provide an entirely satisfactory measurement of the light for reasons which will now be explained.

Normally, a picture is composed of various brightness values which differ from each other, and differences in brightness and contrast are essential for a successful exposure. As previously mentioned, the exposure meter indicates an average value derived from all of the brightness values of the picture. It will be appreciated that the various brightness values are not necessarily of equal importance for the picture. Thus, the foreground may be of more interest to the photographer than is the background, and a near group of trees may be of more interest than a distant forest or vice versa. For example, if a picture of a person is to be taken from a short distance, and possibly even against the light, as against a bright summer sky as the background, the exposure of the negative material, if based on the indication of the exposure meter, will result in under exposure with respect to the person. The picture will not be satisfactory because its main subject, which is the person, will appear unnaturally dark or even as a silhouette. A defective picture is similarly obtained in the opposite case, wherein over exposure of the most important part of the picture is obtained if the picture of a bright object is taken against an extensive dark background and in accordance with the indication of the exposure meter.

In view of the practical experience that, in using the conventional method of measuring the illumination or light with conventional commercial exposure meters, too large an image angle is included, it has been suggested to provide a light incidence angle relative to the photocell of only about one-tenth the value of the light incidence angle entering through the camera objective. According to this suggestion, the light incidence angle of the photocell should be smaller than the average photographic objective. The reduction in output current of the photocell, caused by the reduction of light due to the decrease in the light incidence angle, can be compensated by electrical amplification, for example. However, this suggestion does not satisfactorily solve the problem of always providing a correct measurement of light. It is true that the built-in photocell of the camera, and which, in accordance with such suggestion, has a small light incidence angle, will measure light originating from some part of the object to be photographed. However, there is no guarantee that the incident light to be measured will always originate from the selected main part of the object whose picture is to be taken.

The difficulty in obtaining correct measurement of the light by means of photocells having small incident light angles is solved by the present invention in a simple and reliable manner, utilizing a pivoting or swinging mounting for the photocell. The swingable or pivotal mountings for photocells having a small angle of incident light are, in principle, the same as in the case of photocells having a large angle of incident light, and particularly photocells having a solid angle of incident light which is substantially equal to that of the picture-taking objective.

Figure 3:
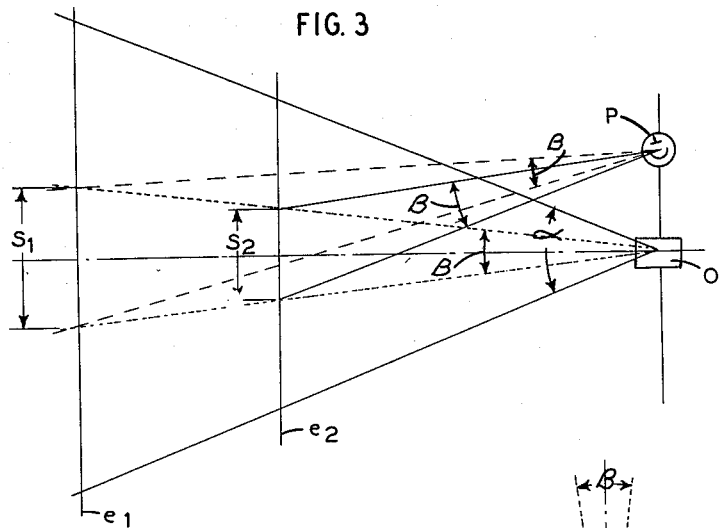
FIG. 3 is a diagrammatic illustration of the light ray cones of a camera objective and of an associated photoelectric cell, when the objective and the photo-electric cell are coordinated in accordance with the principles of the invention.

Referring to FIG. 3, a camera objective $o$, having an image angle $\alpha$, and a photocell $p$, having an incident light solid angle $\beta$, are arranged in a comon plane $b$ including the vertices of the image angle and the incident light angle. If the objective $o$ is sharply focused to the object plane $e_2$, and if, for example, the most important part of the picture is in the center of this object plane, the photocell $p$ should be adjusted in such a manner that the median of its incident light cone or pyramid intersects the optical axis of objective $o$, in object plane $e_2$. If this adjustment is made, the exposure meter will measure only the light originating from the picture portion $s_2$, which may be assumed to cover from one-tenth to one-twentieth of the surface intersected, in the object plane $e_2$, by the image angle $\alpha$, which is a solid angle. By so adjusting photocell $p$ to the relatively small important portion of the object, in most cases a correct light measurement can naturally be expected, because this important portion of the object will almost always coincide with the area of plane $e_2$ intercepted by the light cone angle $\beta$ of the photocell. Thus, no side light, such as would originate from a bright marginal portion or from a luminous sky, is present to affect the light measurement.

If the object plane is displaced from $e_2$ to $e_1$, after the photocell is re-adjusted as above, the incident light angle $\beta$ thereof will intersect the plane $e_1$ over an area indicated by the portion $s_1$. The surface area of portion $s_1$ has the same ratio to the area of plane $e_1$ intersected by the angle $\beta$ as does the area $s_2$ to the portion of plane $e_2$ intersected by the angle $\alpha$. It is thus not essential that the most important part of the object be located in the middle of the object plane, and the most important part of the picture must just as well be located in any other section of the object plane. A correct light measurement, for proper exposure, will always result if the area of the object plane intercepted by the solid angle $\beta$ coincides with such most important part of the picture.

The aforementioned adjustment of the photocell can be carried out most effectively in the described manner, when the camera is provided with a measuring type of finder or range finder. In such a case, the photocell, having a small solid or included angle of incident light, is coupled for movement with the movable element of the range measuring finder. Such a coupling can be effected in any known manner, such as by lever mechanisms, gear mechanisms, or suitably designed cam arrangements. However, it is preferred to couple the photocell directly to the swingable element of the measuring finder so that the photocell positively follows the movements of the latter. To further facilitate use of the entire device, and to leave no doubt about which portion of the image is the point of origin of the measured light, the solid or included angle of the light incident on the photocell is so selected that it exactly corresponds to the field of the measuring finder and includes only this field.

Figure 6:
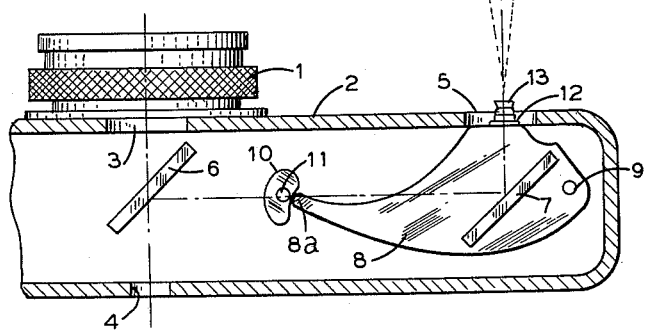
FIG. 6 is a view, similar to FIG. 4, illustrating another arrangement embodying the invention.
Figure 7:
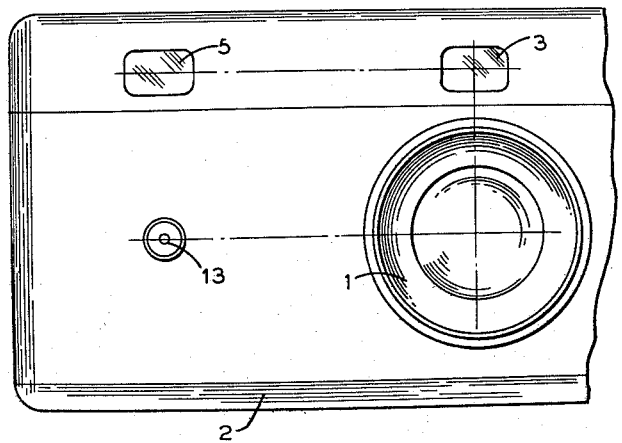
FIG. 7 is a partial front elevational view of the camera illustrated in FIG. 6.

A specific embodiment of such arrangement is shown in FIGS. 6 and 7. Referring to these figures, objective mount 1 is again positioned on the front wall of camera casing 2 and, in vertical alignment with the optical axis of the objective, a window 3 is provided above the objective for directing light rays from the object to be photographed directly to the measuring finder. The image to be photographed may be viewed directly through a viewing opening or window 3. A second window 5 is formed in the front wall at the same level as the window 3 but spaced laterally therefrom by the length of the base of the measuring finder, window 5 being provided for entry of those light rays from the object which reach the viewfinder indirectly. A swingable photocell 13 is disposed directly below the window 5 and in horizontal alignment with the optical axis of objective 2, photocell 13 projecting through an aperture in the front wall of the camera casing. The plane of the light sensitive area or surface of the photocell 13 is assumed to be coincident with the plane of the diaphragm of objective 1.

In a known manner, the measuring finder comprises the windows 3 and 5, a partially permeable mirror 6, a pivoted or swingable mirror 7, and the viewing window 4. Mirror 7 is mounted on a carrier 8 which is swingable about an axis 9 and has a freen end constituting a feeler element or cam follower 8a engaged with a cam disk 10 rotatable about the axis of a pin 11. Cam disk 10 can be coupled or connected in any suitable manner with the means for adjusting the focusing or "distance" setting of objective 1.

The photocell 13 is mounted in a downwardly extending arm 12 of the carrier 8. It is assumed that the measuring light incident on photocell 13 has the relatively small solid angle $\beta$ shown in dotted lines in FIG. 6. Preferably, the solid angle $\beta$ corresponds to the size of the measuring field of the finder which is reflected by the pivoted or swingable mirror 7 into the direct ray path of the viewfinder, this measuring field representing, as known to those skilled in the art, only a small part of the total image seen in the viewfinder.

If the operator now uses the measuring finder to effect sharp focusing of the camera and adjustment thereof to the distance of the selected object to be photographed, exposure meter 13 will simultaneously and automatically be adjusted to measure the light coming from the measuring field as reflected into the direct ray path of the viewfinder. Of course, the reflected measuring field will be adjusted to the most important part of the photographic picture to be taken. Consequently, by means of the invention arrangement, the light intensity of the most important part of the picture will always be measured, so that erroneous exposures are, to all intents and purposes, eliminated. The situation is the same if, in order to obtain a particular picture effect, the photographer uses, as the most important picture element, a portion of the object which is not in the center of the total picture. There will be no change in such case because, before the photographer displaces the camera from the center of the picture to such most important picture element, and before operating the release, he will have determined the distance of the primary motive by means of the measuring field derived from the center of the picture, and thus will have measured the correct light value in this position of the camera. Consequently, the light value indicated by the exposure meter will always be correct with respect to the most important portion of the picture to be taken.

While the embodiments of the present invention can be used in all types of cameras, they offer particular advantages when used in cameras provided with fully automatic operation under the control of the exposure meter, so that adjustment of the exposure factors, such as diaphragm, aperture, and shutter time, is automatically effected.

While specific embodiments of the invention have been shown and described in detail to illustrate the application of the principles of the invention, it will be understood that the invention may be embodied otherwise without departing from such principles.

What is claimed is:

1. In a photographic camera having a casing, an objective having components relatively adjustable axially for focusing of the objective as to distance; an exposure meter including a photocell pivotally mounted in said casing adjacent an aperture in a front wall thereof for swinging movement about an axis spaced from and perpendicular to the axis of said objective; whereby said photocell may be adjusted to a position wherein the median of its included angle of incident light intersects the objective axis in the sharply focused object plane corresponding to the distance setting of said objective; and objective distance setting indicating means operatively associated with said photocell for such adjustment of the latter to the distance setting of said objective; the included angle of incident light on said photocell being only a minor fraction of the image angle of said objective.

2. In a photographic camera, as claimed in claim 1, said distance setting indicating means comprising a pointer movable with said photocell; and an objective distance setting scale cooperable with the end of said pointer.

3. In a photographic camera, as claimed in claim 2, said scale being provided on a top wall of said casing and said pointer being movable over said top wall with respect to said scale.

4. In a photographic camera, as claimed in claim 2, an opening in the rear wall of said casing; said scale being visible through said opening and being arcuate about the pivotal axis of said photocell; the free end of said pointer extending over said scale for cooperation therewith.

5. In a photographic camera, as claimed in claim 1, a measuring viewfinder including an element movable to provide the indirect image of the object in said viewfinder in accordance with the distance setting of said objective; said photocell being movable as a unit with said movable element, and said element constituting said distance setting indicating means.

6. In a photographic camera, as claimed in claim 1, a measuring viewfinder including a relatively fixed semi-light-permeable mirror and a relatively movable fully reflecting mirror; said semi-light-permeable mirror being mounted within said casing in the path of light rays entering through an opening in the front wall of said casing in vertical spaced alignment with said objective and passing through an opening in the rear wall of said casing aligned with said front wall opening; a carrier for said fully reflecting mirror pivoted about an axis laterally spaced from said objective and perpendicular to the axis of said objective; said fully reflecting mirror being fixed on said carrier, and reflecting light rays, entering through another opening in the front wall of said casing on a level with said first mentioned opening in the front wall of said casing, to said semi-permeable mirror; said photocell being supported on said carrier at the level of the axis of the objective and receiving light rays entering through said front wall aperture; and cam means effective to swing said carrier about its axis in accordance with the distance setting of said objective; said carrier constituting said distance setting indicating means.

7. In a photographic camera, as claimed in claim 6, said cam means being coupled to said objective for distance setting of the latter.

References Cited in the file of this patent

UNITED STATES PATENTS

| 2,123,494 | Barnack | July 12, 1938 |
| 2,655,848 | Gray | Oct. 20, 1953 |
| 2,796,799 | Strauss | June 25, 1957 |